United States Patent [19]
Doughty

[11] Patent Number: 6,102,377
[45] Date of Patent: *Aug. 15, 2000

[54] WET SCRUBBING SPRAY APPARATUS FOR REMOVING SULFUR OXIDES FROM COMBUSTION EFFLUENTS

[75] Inventor: Joseph V. Doughty, Knoxville, Tenn.

[73] Assignee: ABB Environmental Services, Division of ABB Flakt, Inc., Knoxville, Tenn.

[*] Notice: This patent issued on a continued prosecution application filed under 37 CFR 1.53(d), and is subject to the twenty year patent term provisions of 35 U.S.C. 154(a)(2).

[21] Appl. No.: 08/807,867

[22] Filed: Feb. 26, 1997

[51] Int. Cl.$^7$ ..................................................... B01D 47/06
[52] U.S. Cl. .............................. 261/117; 95/195; 95/224; 95/235; 96/236; 96/265; 261/DIG. 9
[58] Field of Search ............................ 95/223, 224, 189, 95/195–197; 261/117, 116, DIG. 9; 55/223, 228, 229

[56] References Cited

U.S. PATENT DOCUMENTS

| | | | |
|---|---|---|---|
| 1,222,541 | 4/1917 | Donham | 95/224 |
| 2,180,586 | 11/1939 | Gustafsson | 261/117 X |
| 2,858,903 | 11/1958 | Goetz et al. | 261/116 X |
| 3,140,163 | 7/1964 | Hausberg | 261/116 X |
| 3,995,006 | 11/1976 | Downs et al. | 423/243.08 |
| 4,495,113 | 1/1985 | Kice | 261/117 X |
| 4,776,989 | 10/1988 | Harper et al. | 261/97 |
| 5,173,093 | 12/1992 | Johnson et al. | 95/224 |
| 5,451,250 | 9/1995 | Gohara et al. | 95/224 X |
| 5,474,597 | 12/1995 | Halldin | 95/199 |
| 5,512,072 | 4/1996 | Laslo | 261/117 X |

FOREIGN PATENT DOCUMENTS

| | | |
|---|---|---|
| 0 024 551 | 3/1981 | European Pat. Off. . |
| 62-4428 | 1/1987 | Japan ........................... 261/117 |
| 2297705 | 8/1996 | United Kingdom . |

OTHER PUBLICATIONS

Rader, P.C., Bakke, E., "Incorporating Full–Scale Experience into Advanced Limestone Wet FGD Designs"; IGCI Form '91, Washington, D.C., Sep. 12, 1991.

Primary Examiner—Richard L. Chiesa

[57] ABSTRACT

Sulfur oxides ($SO_x$) are scrubbed from combustion effluents with economies in capital and operating costs by virtue of an arrangement of spray header piping and nozzles which permits ease of access for service with reduced spacing (e.g., 0.5 to 1.25 meters) between spray levels. At least two spray levels in a spray zone include a plurality of spray header pipes arranged parallel to the other spray header pipes within a spray level and vertically parallel to spray header pipes in at least one adjacent spray level. Each of the spray levels includes a plurality of spray nozzles extending from said spray headers. A majority of nozzles in a reference spray level are positioned such that lines drawn between them form a pattern of squares with the nozzles located at the corners of the squares. And, a majority of nozzles in an adjacent spray level are positioned over the centers of squares defined by four nozzles in the reference spray level. Among other advantages of the invention are the ability to support the spray headers by trussing two adjacent headers together in a self-supporting arrangement or by vertically-suspended hangars which do not interfere with access for service.

10 Claims, 6 Drawing Sheets

WET SCRUBBING SPRAY APPARATUS FOR REMOVING SULFUR OXIDES FROM COMBUSTION EFFLUENTS

TECHNICAL FIELD

The invention relates to improvements facilitating servicing of slurry spray apparatus and more efficient removal of sulfur oxides ($SO_x$) from combustion effluents.

Combustion of carbonaceous materials containing significant amounts of sulfur, including fossil fuels and waste, is being closely regulated by governments around the world. Free radicals of sulfur and oxygen are released and combine at the elevated temperatures involved to produce a variety of oxides of sulfur, which are referred to as a group as $SO_x$. Regulations in many countries require reducing the amounts of sulfur oxides released to the atmosphere to alleviate the problems associated with acid rain.

Numerous strategies are being employed to reduce the discharge of $SO_x$ to the atmosphere. Among these are methods for cleaning sulfur from fuels prior to combustion, methods for chemically tying up the sulfur during combustion, and methods for removing the sulfur oxides from combustion effluents. Among the methods for treating combustion effluents to remove $SO_x$, are wet and dry scrubbing. Wet scrubbing technology is well developed and effective; however, very large equipment has been required and costs are proportional.

The technology for wet scrubbing combustion effluents to remove $SO_x$ provides gas-liquid contact in a number of different configurations. Among the most prominent are the single- and double-loop countercurrent spray towers and towers which employ both cocurrent and countercurrent sections.

The single-loop, open-tower systems employing calcium carbonate to react with the $SO_x$ are the simplest in construction and operation. These systems are often preferred because they can be operated with low pressure drop and have a low tendency to scale or plug. The advantages of their simplicity and reliability have, however, been offset in some situations by their large size. For example, because they do not employ any trays or packings to improve contact between the effluent and the scrubbing liquid, tower heights are typically high and many levels of spray nozzles have been employed to assure good gas-liquid contact. Pumping is a major cost, which increases with the head of fluid that must be pumped. Taller towers, thus, increase the cost of construction and operation.

Tower height has been closely related to the number of spray levels and spacing between the levels. Known nozzle arrangements make servicing a considerable problem because they decrease access by a serviceman wanting to move easily among the various pipes and nozzles to find and repair problems. The prior art has typically provided extra headroom by increasing the spacing between spray levels so that one spray level could be serviced at a time without climbing over and around pipes and nozzles. The increased spacing for headroom can reduce servicing costs, but adds to the costs of construction and pumping.

There is a need for means and methods to reduce spray level separation and tower height without compromising the ability to service a spray tower to enable it to be rapidly returned to service.

BACKGROUND ART

The design and operation of single-loop, countercurrent spray towers utilizing limestone is discussed by Rader and Bakke, in *Incorporating Full-Scale Experience Into Advanced Limestone Wet FGD Designs*, presented at the IGCI* Forum 91, Sep. 12, 1991, Washington, D.C. (*formerly the Industrial Gas Cleaning Institute, now the Institute of Clean Air Companies, Washington, D.C.). Open spray towers (i.e., those not having packings, trays or other means for facilitating gas-liquid contact) are simple in design and provide high reliability. They are especially useful in coal-fired power stations where the evolution of chlorides has caused a number of problems, including reduced reactivity of the scrubbing solution and severe corrosion of scrubber internals. Another factor favoring the use of open spray towers is their inherent low pressure loss and resulting fan power economy.

In single-loop, countercurrent, open scrubbing towers of the type discussed by Rader and Bakke, a scrubbing slurry composed of calcium carbonate, calcium sulfate, calcium sulfite, and other non-reacting solids flows downwardly while the $SO_x$-laden effluent gas flows upwardly. The $SO_x$, principally $S02$, is absorbed in the descending scrubbing slurry and is collected in a reaction tank where calcium sulfite and calcium sulfate are formed. Desirably, the reaction tank is oxygenated to force the production of sulfate over sulfite. Once the crystals of sulfate are grown to a sufficient size, they are removed from the reaction tank and separated from the slurry. This reference and the one that follows are incorporated by reference in their entireties for the descriptions of the known technology of wet scrubbing.

Rader and Bakke note that pumping costs account for about 50% of the total power requirements of the system. They show spray levels oriented at acute angles relative to each other and suggest spacing between the levels of from 5 to 6 feet. The spacing is compelled by what is considered in the prior art to be appropriate for constraints of the header and support systems. With spacings between the angularly-oriented spray levels at the suggested values, tower height and pumping costs will increase. With lower spacings, servicing will become extremely difficult.

In U.S. Pat. No. 5,173,093, Johnson, et al., describe a single-spray level, which is designed to take the place of multiple spray levels, in a flue gas desulfurization system. The arrangement described has a plurality of spray headers, all arranged in parallel within a common horizontal plane. The device, having all spray heads in one plane, cannot provide for efficient overlap of spray patterns to successfully deal with the problem of gas pass through or channeling.

The prior art does not address the points necessary to reduce tower height for wet scrubbers for $SO_x$ reduction, while addressing the issue of servicing in an efficient manner.

DISCLOSURE OF THE INVENTION

It is an object of the invention to provide improved apparatus and processes for wet scrubbing combustion effluents to remove sulfur oxides.

It is another object of the invention to facilitate servicing of spray apparatus in wet scrubbers.

It is a more specific object of the invention to reduce the size of single-loop, open-tower, countercurrent limestone wet scrubbers.

It is yet another object of the invention to improve the design and location of spray equipment in wet scrubbing towers.

It is a still further object of a preferred embodiment of the invention to improve the process efficiency of single-loop, open-tower, countercurrent limestone wet scrubbers by achieving effective liquid to gas contact within a scrubbing zone of reduced height.

These and other objects are accomplished by the invention, which provides both improved processes and apparatus for wet scrubbing.

In one aspect, the invention provides an improved wet scrubbing apparatus for reducing the concentration of $SO_x$ in flue gases, said apparatus being of the type comprising, an inlet for flue gases, an outlet for the flue gases, a spray zone positioned between the inlet and the outlet, wherein the improvement comprises: at least two spray levels in said spray zone, each of the spray levels comprising a plurality of spray header pipes arranged parallel to the other spray header pipes within a spray level and vertically parallel to spray header pipes in at least one adjacent spray level spaced by less than 1.25 meters.

In another aspect of the invention, the improvement in scrubbers of this type comprises: employing at least two spray levels in the spray zone with each of the spray levels comprising a plurality of spray nozzles, wherein a majority of nozzles in a reference spray level are positioned such that lines drawn between them form a pattern of squares, with the nozzles located at the corners of the squares, and a majority of nozzles in an adjacent spray level are positioned over the centers of squares defined by four nozzles in the reference spray level.

Preferably, each spray level is fed independently by a feed header, which supplies slurry to all of the spray header pipes in the spray level. It is an advantage of the invention that the spray headers can be either self-supporting with the aid of trussing or suspended by vertically-suspended hangars without interfering with servicing or requiring the 5 to 6 feet spacing required by prior art wet scrubbers.

In another aspect, the invention improves a process of the type where a flow of flue gas containing $SO_x$ is directed upwardly through a vertical scrubbing tower, a spray of an aqueous slurry of $SO_x$-reducing reagent is introduced from a plurality of spray levels within a spray zone to contact the flue gas while descending through the tower countercurrently to the flow of flue gas, the slurry is collected and a portion of it is recycled for contact with the flue gases, wherein the improvement comprises: providing at least two spray levels in said spray zone, each of the spray levels comprising a plurality of spray header pipes arranged parallel to the other spray header pipes within a spray level and vertically parallel to spray header pipes in at least one adjacent spray level spaced by less than 1.25 meters.

BRIEF DESCRIPTION OF THE DRAWINGS

The invention will be better understood and its advantages will be better appreciated from the following detailed description, especially when read in light of the accompanying drawings, wherein.

Industrial Applicability

The improvements of the invention have preferred application to utility boiler flue gases, and this embodiment will be described for purposes of illustrating the invention and its advantages. The invention is not limited to this embodiment and effluents from all types of combustion sources and utilizing packed or other scrubbing apparatus are envisioned.

Figure 1:
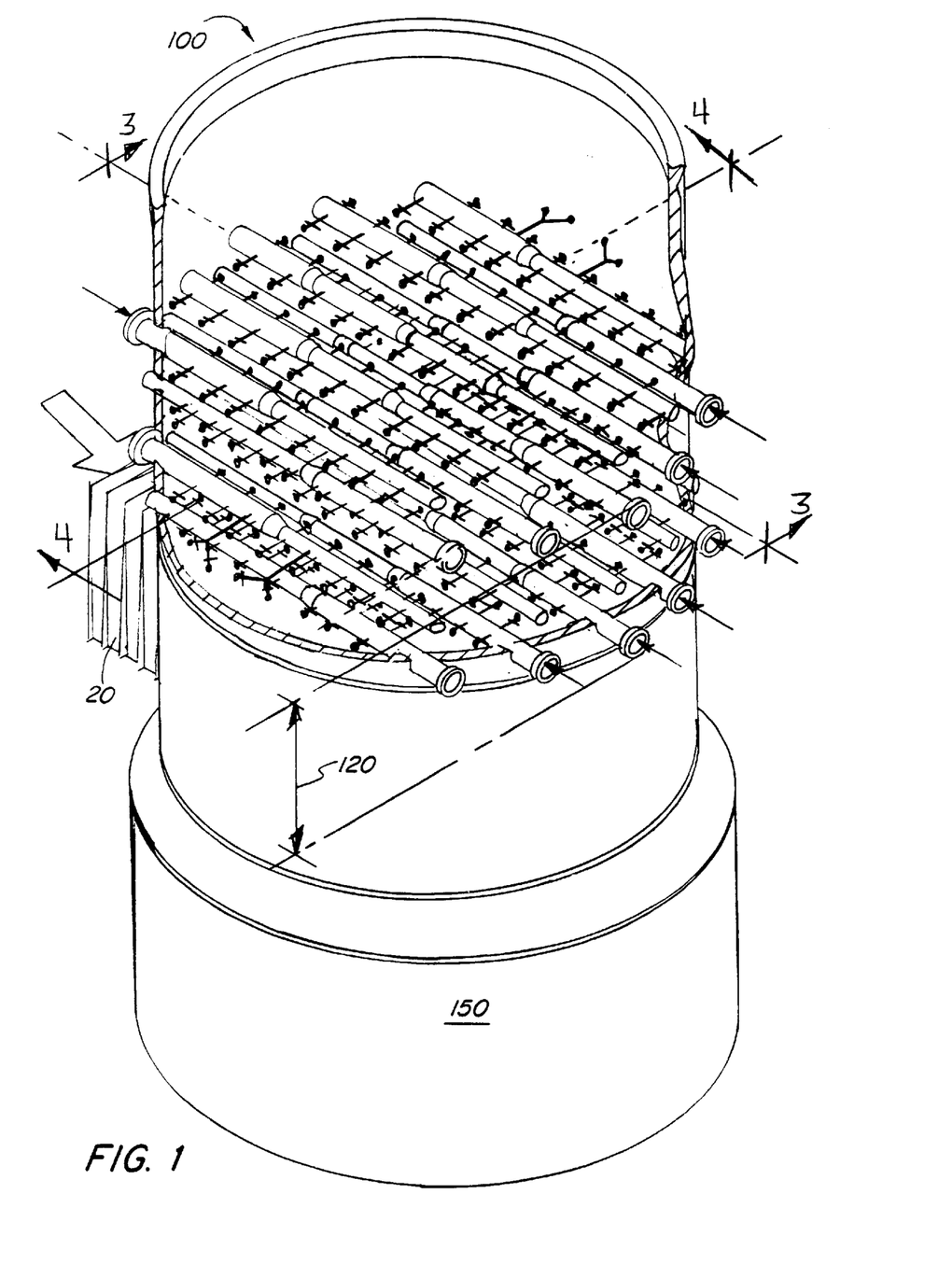
FIG. 1 is a schematic perspective view of a preferred embodiment of the invention employing a new spray nozzle arrangement in a single-loop, open-tower, countercurrent limestone wet scrubber.

FIG. 1 illustrates a single-loop, open-tower, countercurrent limestone wet scrubbing tower for removing sulfur oxides, principally as $SO_2$, from combustion effluents. See also FIG. 7, which is a schematic of a side elevation showing the major components of a typical open tower scrubber modified according to the invention. This is the preferred embodiment of the invention, but the invention has applicability to cocurrent flow scrubbers as well as other configurations and design, including those with spray nozzles that direct flow of scrubbing fluid both upwardly and downwardly.

The preferred form of wet scrubbers, employ alkaline $SO_x$-reducing reagents, including calcium compounds like lime and limestone, sodium compounds like sodium hydroxide and sodium carbonate, and ammonium compounds, as the art has described as useful for $SO_x$-reducing reagents in their various commercial forms. Almost all accessible forms of calcium carbonate found in nature contain minor quantities of relatively inert materials, such as free silica, magnesium carbonate or dolomite, iron oxides, alumina, and so forth. Limestone is a preferred form of calcium carbonate but can be replaced with another form, if desired. In addition to limestone, other forms of calcium carbonate include oyster shells, aragonite, calcite, chalk, marble, marl, and travertine. It can be mined or manufactured. In this description, the terms calcium carbonate and limestone are used interchangeably. The limestone is finely divided, preferably by grinding to achieve a weight median diameter of about less than $44\mu$, and slurried with from about 15 to about 35% water. This and all percentages set forth herein are based on the weight to the total composition.

Figure 6:
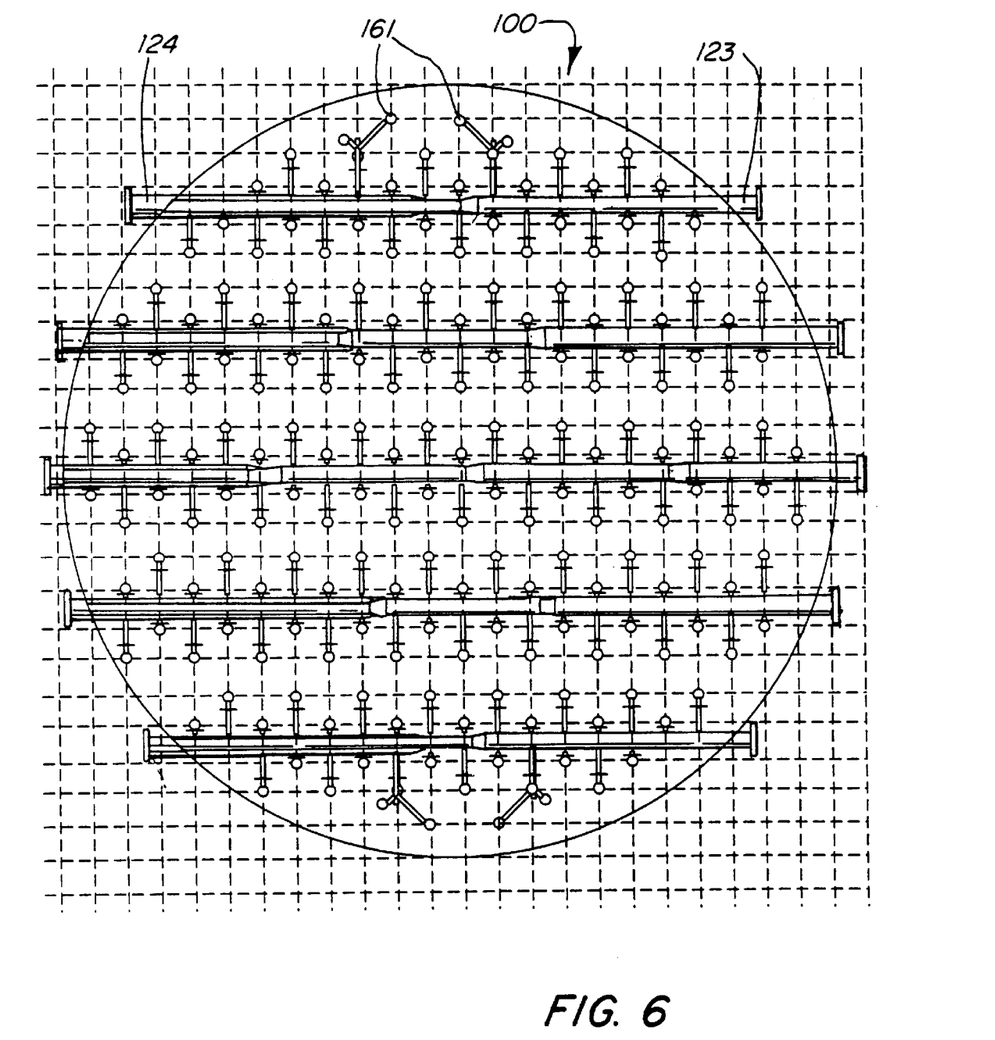
FIG. 6 is a cross-sectional view taken along plane 6—6 in FIG. 3.
Figure 7:
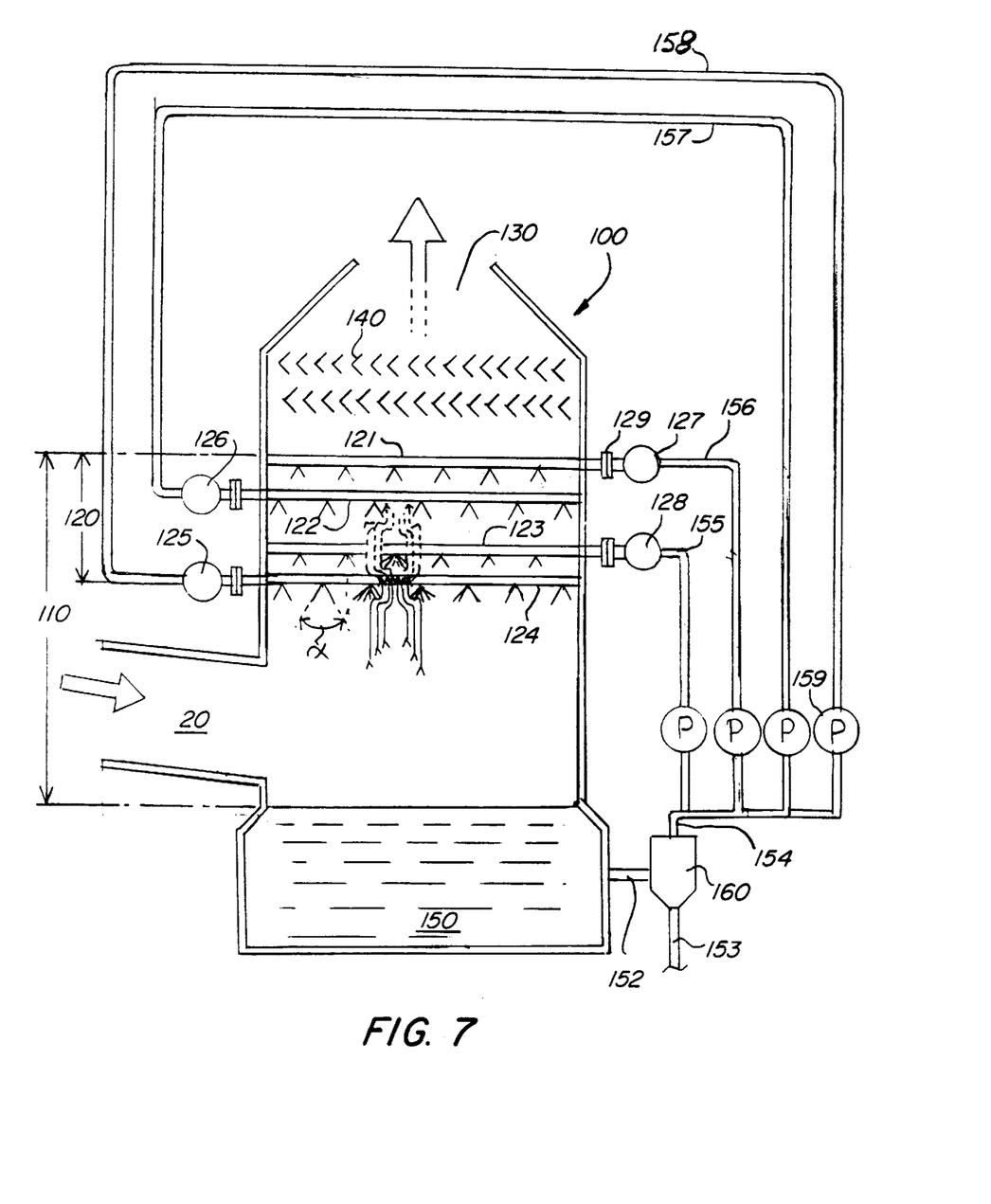
FIG. 7 is a schematic of a side elevation showing the major components of a typical open tower scrubber modified according to the invention.

The preferred process arrangement of FIGS. 1 and 7 shows an effluent, preferably cleaned of particulates, such as by an electrostatic precipitator or fabric filter, passed via duct 20 to wet scrubbing tower 100 wherein it flows upwardly, countercurrent to a spray of an aqueous slurry which contains limestone discharged within a vertical scrubbing section 110 including a spray zone 120 having four spray levels 121, 122, 123 and 124. FIGS. 2–6 and the description that follows will explain the arrangement and spacing in more detail. From the scrubbing section 110, the gas continues through gas outlet duct 130. The tower is configured to direct a flow of flue gas upwardly through the vertical scrubbing section. The scrubbed effluent is significantly freed of entrained droplets of liquid by a suitable entrainment separator 140 and discharged to a stack (not shown).

The scrubbing slurry falling through the vertical scrubbing section 110 is collected in reaction tank 150. The reaction tank 150 is preferably of a size suitable to permit reaction of the $SO_2$ with the calcium carbonate to form crystals of gypsum having a weight median diameter sufficiently large to assure their separation by suitable means, such as a hydrocyclone 160, for removal from the system. A stream of the slurry is constantly withdrawn from the tank via line 152 and passed through hydrocyclone 160 or other suitable separation device to provide one stream 153 for discharge and another 154 for recycle to the scrubbing zone. Recycle to the scrubbing zone is done via lines 155–158. Preferably, each line is associated with a separate pump means, e.g., 159 in line 158. In this manner, each of the scrubbing levels is fed from a dedicated supply header, e.g., headers 125–128.

Figure 2:
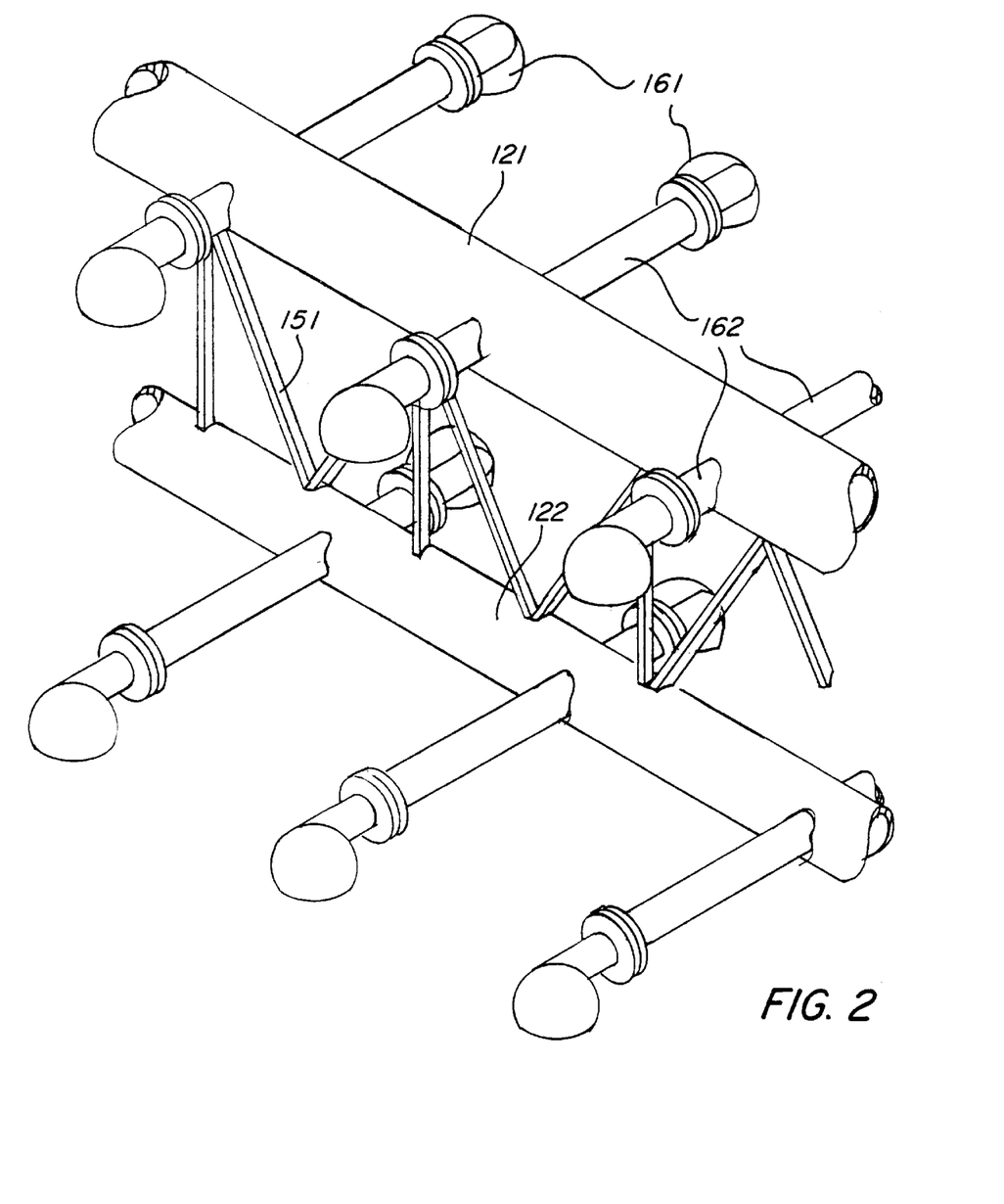
FIG. 2 is perspective view, broken away from FIG. 1, showing the detail of a preferred nozzle arrangement for two adjacent spray levels.
Figure 3:
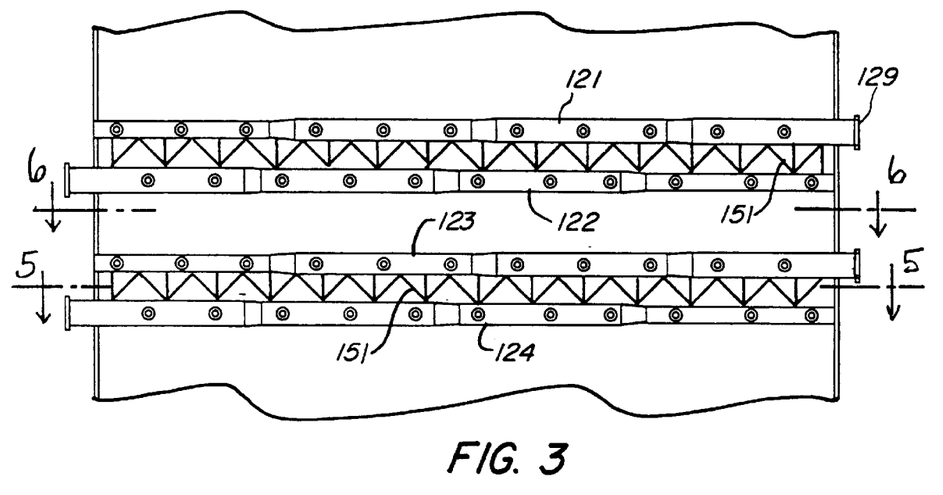
FIG. 3 is cross-sectional view taken along plane 3—3 in FIG. 1.

FIG. 3 illustrates the close alignment and configuration of vertically-parallel spray header pipes in four spray levels. The flanged ends of each, e.g., flange 129 on the illustrated spray header in spray level 121, facilitates connection to the supply headers 125–128. FIGS. 2 and 3 also illustrate how the vertical alignment and close adjacent spray levels (spaced by less than 1.25 meters) enable self supporting the spray levels by forming a truss structure 151 between two adjacent spray header pipes. The connection in this or equivalent manner creates a beam structure between the two and greatly increases the ability of the headers to support weight. The preferred spacing between at least two of the spray levels, two closely adjacent spray levels, is from about 0.5 to about 1.25 meters, more narrowly from about 0.5 to about 1 meters, e.g., about 0.75 meters in one exemplary embodiment. These spacings are from the centerline of a spray header pipe in one level to the centerline of its mate in the adjacent level.

Figure 4:
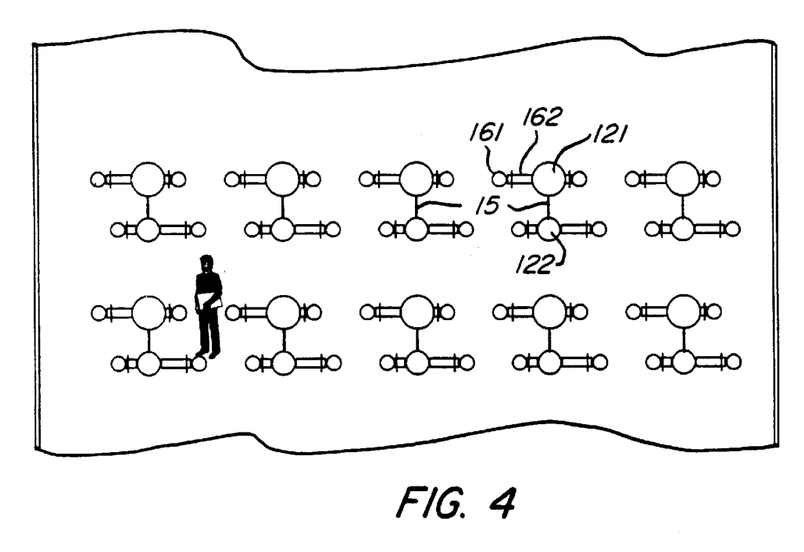
FIG. 4 is a cross-sectional view taken along plane 4—4 in FIG. 1.

Referring to FIG. 4, it is easy to see how a service man can walk unobstructed through the interior of the scrubber to service two spray levels from a scaffolding or flooring supported at one level. There is sufficient headroom between the levels as indicated, and there are no obstructions to step over or walk around on a clear path from one wall of the scrubbing tower to the other. Servicing is facilitated if the elevation of the spray levels above the lowermost, is sufficient to enable a man to stand up—e.g., the height from level 121 to level 123 being at least 1.5 meters and preferably at least about 1.8 meters.

Figure 5:
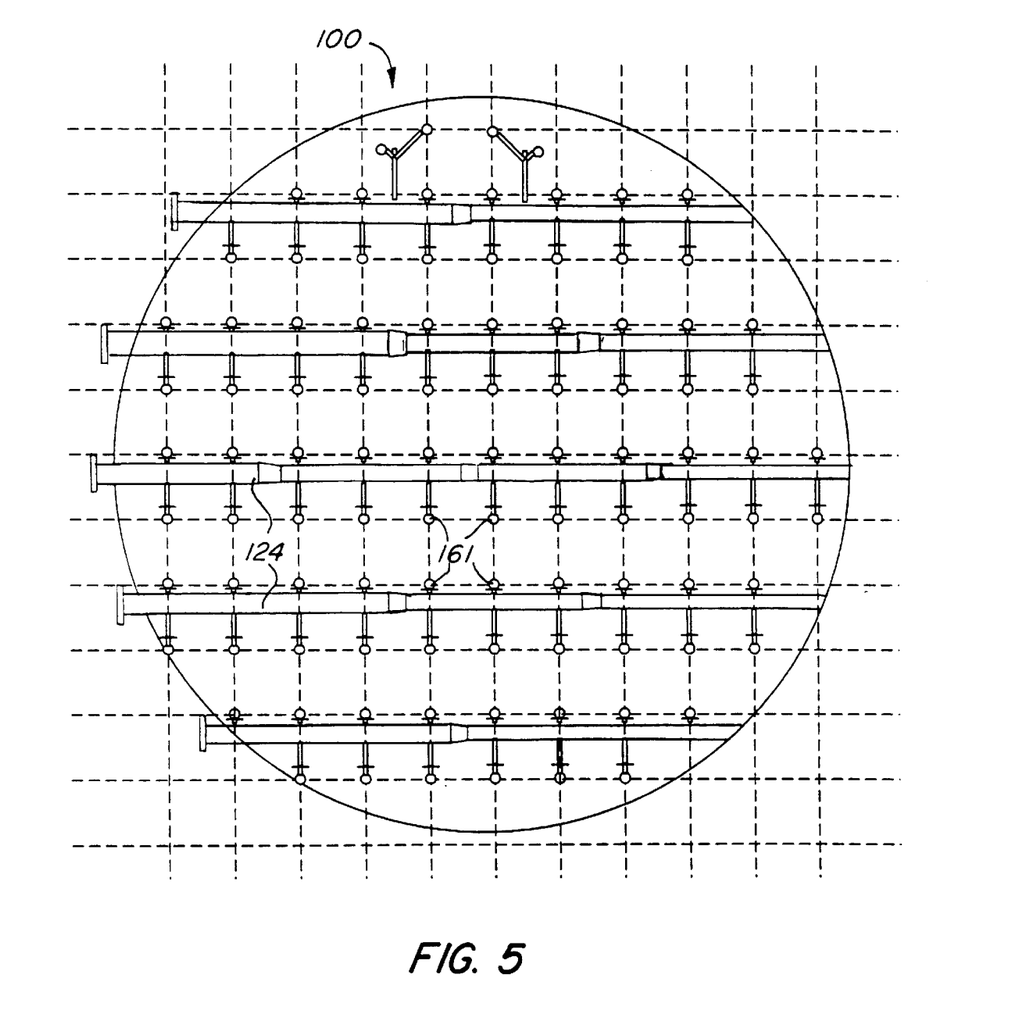
FIG. 5 is cross-sectional view taken along plane 5—5 in FIG. 3.

FIG. 5 shows one illustrative spray level, with the nozzles (indicated by the circles, e.g., 161, at the end of lines, e.g., 162, feeding them from a spray header, e.g., 121) arranged in a square pattern. Note that in this embodiment, a majority of the nozzles (preferably all, except those near the periphery) are at the corners of the squares in the pattern. FIG. 6 is then referenced to show the overlapping of the patterns of two adjacent levels. Here the nozzles of the illustrated closely adjacent level are located so that a majority is positioned at the center of a square in the pattern of the other illustrated level. This pattern has special advantage when employing the parallel, closely-spaced adjacent spray levels because the gas flow past the nozzles in one level will be diverted directly into the spray of the nozzles in the adjacent level. Reference to FIG. 7 (see also FIGS. 4 and 6 for the detail of nozzle arrangement) will help visualize how the spray from one nozzle at a corner of a square (say, in level 124) will be directed in the next, close-adjacent level (in this example, 123) where a nozzle is located at the center of each above square. With larger, conventional spacings between levels, the effect of this flow diversion will not occur or be as pronounced. With larger spacings, the flow is enabled to reorganize to the extent that bypass of the next level of nozzles can occur. Provision of the closely adjacent levels of the invention provides more intimate, vigorous contact than can be otherwise achieved.

FIG. 7 shows the height of the scrubbing zone as 110, being the distance between the top of the liquid in the tank 150 and the uppermost spray level, 121. This is the head of liquid that must be pumped. This height is affected by the height of the spray zone 120. Thus, as the height of the spray zone 120 is decreased by the invention, the head of liquid that must be pumped is decreased. This is an advantage of the invention, and it is surprising that pumping costs can be reduced while achieving improved gas-liquid contact. These advantages are especially surprising when viewed in connection with improvements in service accessibility that are also achieved.

A preferred form of nozzle is a centrifugal nozzle, which forms a spray at an angle α of within the range of from about 90 to about 140°, preferably about 120°. One suitable nozzle is a Whirljet 300 gallon per minute nozzle available from Spraying Systems Co., Wheaton, Ill. Droplet sizes are preferably in the range of from about 100 to about 6000μ, typically about 2000μ, Sauter mean diameter as measured by a Malvern Particle Analyzer. Other nozzle designs can be employed, including those that direct flow of scrubbing fluid both upwardly and downwardly.

The above description is for the purpose of teaching the person of ordinary skill in the art how to practice the invention, and it is not intended to detail all of those obvious modifications and variations of it which will become apparent to the skilled worker upon reading the description. It is intended, however, that all such obvious modifications and variations be included within the scope of the invention which is defined by the following claims. The claims are meant to cover the claimed elements and steps in any arrangement or sequence that is effective to meet the objectives there intended, unless the context specifically indicates the contrary.

What is claimed is:

1. An improved wet scrubbing apparatus for reducing the concentration of $SO_x$ in flue gases, said apparatus comprising an inlet for flue gases, an outlet for the flue gases, and a spray zone positioned between the inlet and the outlet, wherein the improvement comprises:

at least two spray levels in said spray zone, each of the spray levels comprising a plurality of spray header pipes arranged parallel to the other spray header pipes within a spray level and vertically parallel to spray header pipes in at least one adjacent spray level spaced by less than 1.25 meters, wherein the spray header pipes are each supported at one end by a wall which defines part of the spray zone and are supported through its length by a truss structure and a vertically adjacent spray header pipe to create a beam structure between the two to greatly increase the ability of the header pipes to support weight.

2. A wet scrubbing apparatus according to claim 1, wherein:

the spray header pipes are each supported at one end by a wall which defines part of the spray zone and are supported at the other end by a hanger which is suspended vertically to attach at least two vertically-spaced spray header pipes.

3. A wet scrubbing apparatus according to claim 1, wherein:

each spray level is fed independently by a feed header, which supplies slurry to all of the spray header pipes in the spray level.

4. An improvement in a wet scrubbing apparatus for reducing the concentration of $SO_x$ in flue gases, said apparatus comprising an inlet for flue gases, an outlet for the flue gases, and a spray zone positioned between the inlet and the outlet, wherein the improvement comprises:

said spray zone comprises at least two spray levels, and each of the spray levels comprises a plurality of spray nozzles supported by spray header pipes, wherein the spray header pipes are each supported at one end by a wall which defines part of the spray zone and are supported at the other end by a hanger which is suspended vertically to attach at least two vertically-spaced spray header pipes, a majority of nozzles in a reference spray level are positioned such that lines drawn between them form a pattern of squares with the nozzles located at the corners of the squares, and a majority of nozzles in an adjacent spray level are positioned over the centers of squares defined by four nozzles in the reference spray level, wherein one spray level and one adjacent spray level are spaced at a distance of less than about 1.25 meters.

5. A wet scrubbing apparatus according to claim 4, wherein:

each spray level is fed independently by a feed header, which supplies slurry to spray header pipes feeding spray nozzles in the spray level.

6. A wet scrubbing apparatus according to claim 4, wherein:

each of the spray levels comprising a plurality of spray header pipes arranged parallel to the other spray header pipes within a spray level and vertically parallel to spray header pipes in at least one adjacent spray level.

7. A wet scrubbing apparatus according to claim 4, wherein:

spray header pipes are provided for feeding spray nozzles and each is supported at one end by a wall which defines part of the spray zone and each is supported through its length by an adjacent spray header pipe.

8. An improvement in a wet scrubbing apparatus for reducing the concentration of $SO_x$ in flue gases, said apparatus comprising an inlet for flue gases, an outlet for the flue gases, and a spray zone positioned between the inlet and the outlet, wherein the improvement comprises:

at least two spray levels in said spray zone, each of the spray levels comprising a plurality of spray header pipes arranged parallel to the other spray header pipes within a spray level and vertically parallel to spray header pipes in at least one adjacent spray level, the spray header pipes are each supported at one end by a wall which defines part of the spray zone and are supported at the other end by a hanger which is suspended vertically to attach at least two vertically-spaced spray header pipes, and each of the spray levels comprises a plurality of spray nozzles extending from said spray header pipes, wherein a majority of nozzles in a reference spray level are positioned such that lines drawn between them form a pattern of squares with the nozzles located at the corners of the squares, and a majority of nozzles in an adjacent spray level are positioned over the centers of squares defined by four nozzles in the reference spray level, and wherein one spray level and one adjacent spray level are spaced at a distance of less than about 1.25 meters.

9. A wet scrubbing apparatus according to claim 8, wherein:

the spray header pipes are each supported at one end by a wall which defines part of the spray zone and are supported through its length by an adjacent spray header pipe.

10. A wet scrubbing apparatus according to claim 8, wherein:

one spray level and one adjacent spray level are spaced at a distance of from about 0.5 to about 1.0 meters.

* * * * *